3,138,537
FUEL ELEMENTS FOR NUCLEAR REACTORS
Andrew Thomson Bowden, Newcastle-upon-Tyne, England, assignor to C. A. Parsons & Company Limited, Newcastle-upon-Tyne, England
Filed Nov. 4, 1958, Ser. No. 771,860
Claims priority, application Great Britain Nov. 12, 1957
2 Claims. (Cl. 176—67)

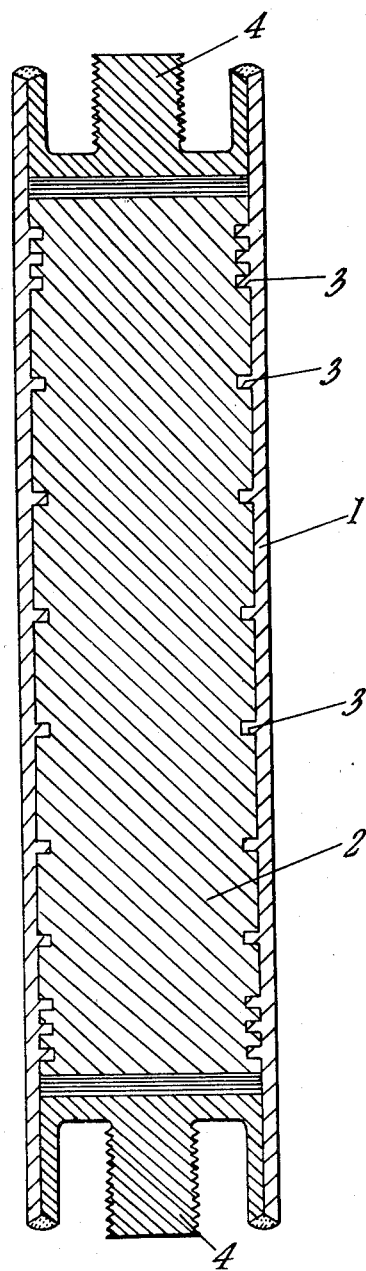

This invention relates to nuclear reactor fuel elements of the kind in which solid nuclear fuel, for example, natural uranium, is housed in a container.

Under operational conditions in the reactor differential expansion takes place between the container and the fuel and deformation of the container may result.

It has been proposed to interlock the contacting faces of fuel and container by forming equally spaced recesses in the fuel and then, after it has been inserted in the container, applying pressure to the latter so as to cause the material of the container to fill the recesses in the fuel and interlock the faces of fuel and container.

It has been found that stress concentrations occur at the ends of the element with the result that there is a tendency for the metal of the container embedded in the end recesses to shear off from the container allowing movement of the container relative to the fuel and the formation of a gap between the end of the fuel and the end of the container.

The object of the present invention is to provide means to minimise these effects.

The invention consists in a fuel element for a nuclear reactor, which element comprises solid nuclear fuel housed in a container, said fuel having provided therein a plurality of spaced recesses or grooves extending over its length, into which grooves the material of the container can be caused to merge by the application of pressure to the outside of the container prior to the insertion of the element in the reactor, the recesses or grooves being more closely spaced at the ends of the fuel than in the portion intermediate the ends.

The invention also consists in a fuel element in accordance with the preceding paragraph substantially as described below.

The invention also consists in a fuel element substantially in accordance with the accompanying diagrammatic drawing.

In carrying the invention into effect in the form illustrated by way of example a fuel element for a nuclear reactor consists of a container 1 housing a solid bar 2 of natural uranium. The uranium contains a plurality of spaced grooves or recesses 3 disposed along its length, the grooves at the ends of the element being more closely spaced than those in the portion intermediate the ends.

After insertion in the container the ends of the container are sealed by means of end closure members 4 and then the whole of the container is subjected to pressure, as a result of which the material of the container, for example magnesium alloy, is forced into the grooves formed in the uranium thus interlocking the contacting faces of uranium and container.

As a result of the above spacing of the grooves the stresses induced in the end region of the elements are taken up by a series of closely spaced grooves and the possibility of the portion of the container in the end grooves shearing off is considerably reduced.

The invention is applicable to fuel elements having finned containers as well as those in which the container surface has no fins.

Whilst in the form described the recesses take the form of continuous grooves, they may be formed by individual recesses more closely spaced from each other at the ends than in the middle of the element.

I claim:

1. A fuel element for a nuclear reactor, which element comprises solid nuclear fuel housed in a container, said fuel having provided therein a plurality of spaced recesses extending over its length, into which recesses the material of the container can be caused to merge by the application of pressure to the outside of the container prior to the insertion of the element in the reactor, the recesses being more closely spaced at the ends of the fuel than in the portion intermediate the ends.

2. A fuel element according to claim 1, in which the said recesses adjacent the ends of the element are spaced more closely than those adjacent its middle.

References Cited in the file of this patent
UNITED STATES PATENTS

| | | |
|---|---|---|
| 2,838,452 | West et al. | June 10, 1958 |
| 2,873,238 | Ohlinger et al. | Feb. 10, 1959 |